Inventors.
Eugen Meyer
Eduard Singer by Michael S. Striker

July 15, 1969  E. MEYER ET AL  3,455,765
APPARATUS FOR PRODUCING FIBER-REINFORCED PLASTICS
SECTIONS, PARTICULARLY LONGITUDINALLY TAPERING
SECTIONS, WITH THE AID OF A MANDREL
Filed Sept. 29, 1965  7 Sheets-Sheet 7

Inventors
Eugen Meyer
Eduard Singer

Michael J Striker

United States Patent Office 3,455,765
Patented July 15, 1969

3,455,765
APPARATUS FOR PRODUCING FIBER-REIN-
FORCED PLASTICS SECTIONS, PARTICU-
LARLY LONGITUDINALLY TAPERING SEC-
TIONS, WITH THE AID OF A MANDREL
Eugen Meyer, Guebwiller, and Eduard Singer, Mulhouse,
France, assignors to Mancar-Trust, Vaduz, France
Filed Sept. 29, 1965, Ser. No. 491,299
Claims priority, application Germany, Sept. 29, 1964,
P 35,176
Int. Cl. B29d 23/00; B32b 31/02
U.S. Cl. 156—431                                23 Claims

ABSTRACT OF THE DISCLOSURE

Apparatus for producing elongated filament reinforced plastic elements, particularly longitudinally tapering elements, in which a plurality of filaments are longitudinally applied to a tapering mandrel in such a manner that more filaments are applied to the large diameter portion of the mandrel than to the small diameter portion thereof and in which at least one filament is wound transversely about the longitudinally applied filaments while the filaments are embedded in plastic material to thus produce a reinforced plastic tube which is pulled off the mandrel and which may be subsequently deformed in transverse direction.

---

This invention relates to an apparatus for producing fiber-reinforced plastics sections, particularly longitudinally tapering sections, with the aid of a mandrel.

It is already known to provide plastics sections, such as tubes, with fibers, such as glass fibers, for the purpose of substantially improving their mechanical strength.

One of the objects of the present invention is to provide a method, as well as an apparatus for carrying out said method, which will permit such plastics sections, particularly sections that have a longitudinal taper, to be produced in a simple manner. In such sections it is of primary importance that the density of the longitudinally orientated incorporated fibers which carry the longitudinal strain is substantially uniform or as may be desired, irrespectively of changes in the thickness of the section along its length. For instance, in the case of a conically tapering tubular section this permits a body of uniform strength to be produced.

Another object of the invention is to provide a method of further deforming an uncured plastics tapering tubular section to produce other sections, such as tapering angle sections or T-sections.

For solving this problem the method proposed by the present invention comprises the following steps:

(a) applying to the surface of a mandrel in the lengthwise direction thereof filaments that have been or are to be impregnated with plastics, and moving said filaments together with the advancing mandrel;
(b) winding further filaments that have been or are to be impregnated with plastics across the longitudinal filaments;
(c) possibly applying additional longitudinal filaments to the mandrel during its working stroke;
(d) withdrawing from the mandrel the plastics tube that has been formed on the mandrel by the three above defined steps (a) to (c), possibly after the plastics has set.

Preferably the longitudinal filaments are impregnated with uncured plastics or the like after they have been applied to the mandrel.

For carrying out this method the invention provides an apparatus which comprises at least one filament distributor embracing the mandrel and carrying a plurality of filament guides for the longitudinal filaments adapted to be retracted into inoperative positions or advanced into different working positions.

Some preferred embodiments of apparatus for carrying out the method will now be described by way of example and with reference to the accompanying drawings which are highly schematic representations on different scales and in which:

FIG. 8a is a side view.

Figure 1:
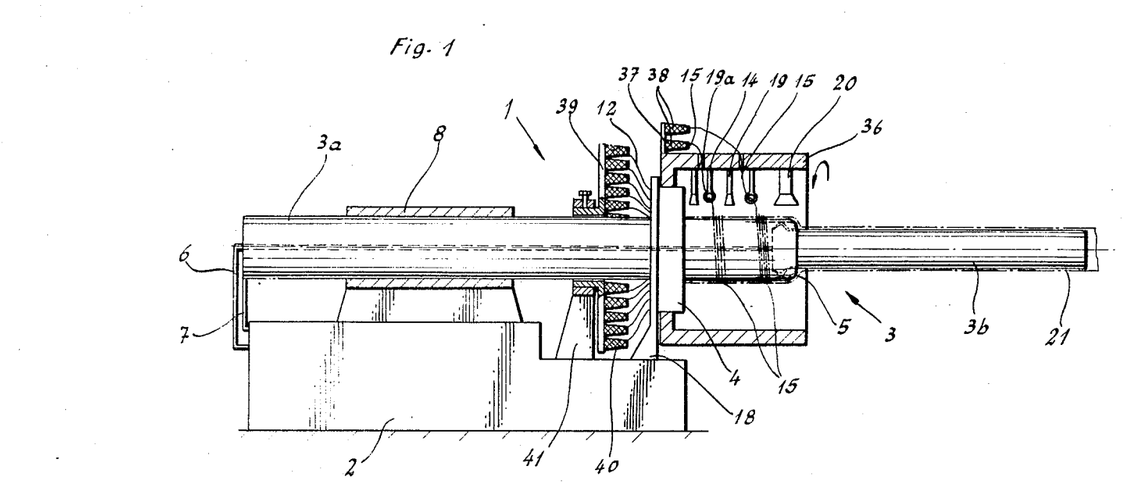
FIG. 1 is a side elevation, partly in section, of an apparatus for producing hollow tapering sections according to the invention.

FIG. 1 is a side elevation of an apparatus generally indicated by the reference numeral 1 for the production of fiber-reinforced plastics sections. The apparatus is mounted on a machine frame 2 and has a divided mandrel 3 and a filament distributor 4. The divided mandrel 3 in FIG. 1 comprises a rear mandrel portion 3a and a front mandrel portion 3b which has a smaller diameter than the rear mandrel portion 3a in which it is telescopically guided. The forward end of the rear mandrel portion 3a has a rounded edge 5 to form a gentle transition between the peripheral surfaces of the two portions 3a and 3b of the mandrel 3. Both the forward mandrel portion 3b and the rear mandrel portion 3a are connected by rod means 6 and 7 respectively with actuating means not specially shown adapted to move the mandrel portions in the axial direction. The rear mandrel portion 3a is slidable in guideways 8.

Figure 3:
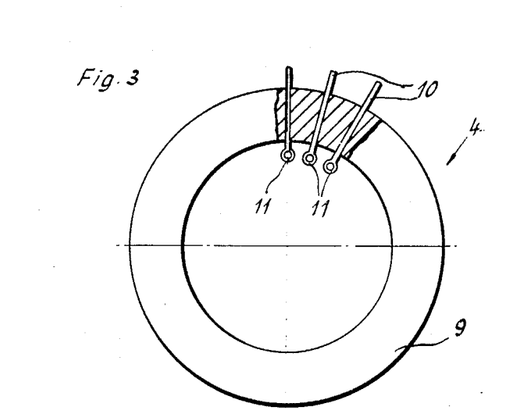
FIG. 3 is a part cross sectional representation of a filament distributor.
Figure 4:
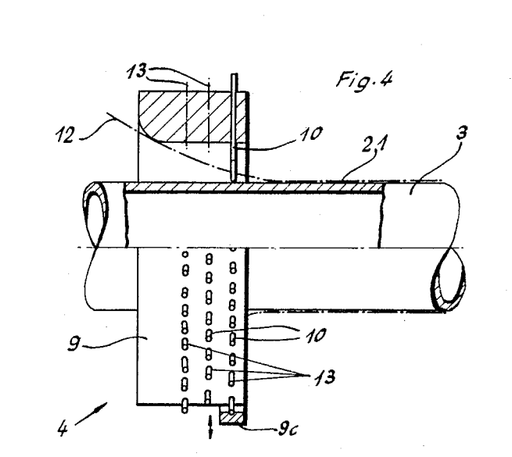
FIG. 4 is a part sectional side elevation of the filament distributor.
Figure 5:
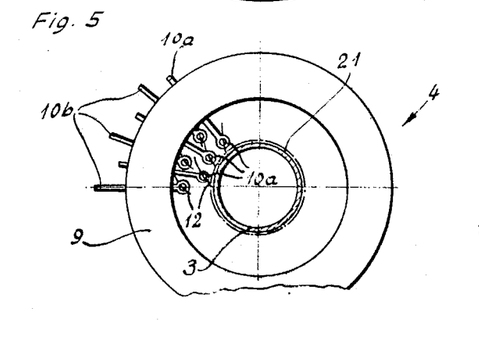
FIG. 5 is a rear view of the filament distributor, some of the filament guides being in working position and others in position of rest.
Figure 5A:
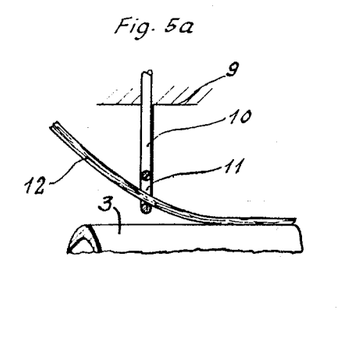
FIGS. 5a and 5b are details of the filament distributor.
Figure 5B:
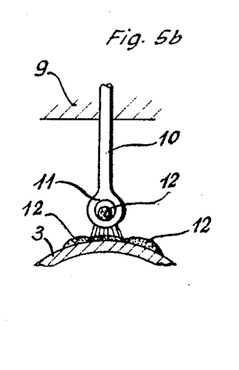
Figure 6:
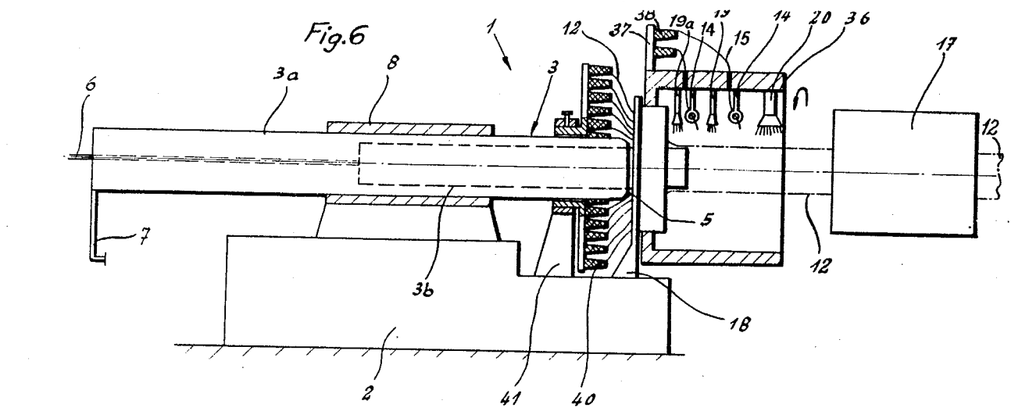
FIG. 6 is a side elevation, partly in section, of an apparatus similar to that shown in FIG. 1, at the beginning of a working stroke of the mandrel.

The filament distributor 4 which is illustratively shown in FIGS. 3 to 5 represents an essential part of the invention. It comprises a ring 9 in which a large number of filament guides 10 are radially slidably mounted. Each filament guide 10 has an eyelet 11 at its inside end through which the filaments run. In this context it should be noted that generally speaking the eyelet 11 of each filament guide will not carry a single filament but an untwisted rope of a plurality of glass filaments or the like, and that for the sake of simplicity the term filament will be hereinafter understood to include such ropes consisting of a large number of filaments, as indicated at 12 and 15. On a substantially enlarged scale FIGS. 5a and 5b show the manner in which a rope of filaments 12 is conducted through the eyelet 11 of a filament guide and is thus run on to a given part of the periphery of the mandrel 3. If desired, the filament guides 10 may be disposed in several consecutive rows 13 in the ring 9 of the filament distributor 4. In FIG. 5 some filament guides 10a are shown in their working positions whereas other filament guides 10b are shown in their positions of rest. The working filament guides 10a have been advanced into proximity with the mandrel 3 to apply the filaments 12 as they run through the eyelets to the surface of the mandrel 3. The eyelets 11 of the filament guides 10b which are in position of rest likewise carry filaments 12, but the ends of these filaments do not extend to the mandrel. The filament guides 10 are radially adjustabily mounted in the ring 9, and setting means 9c for the filament guides 10 are provided.

Assuming that it is desired to use a divided mandrel 3a, 3b, as illustrated in FIG. 1, the work may proceed as follows:

Initially only 32 filament guides 10a may be working position. Assuming the diameter of the mandrel portion 3b to be 50 mm., the radial distance of these filament guides from the mandrel axis may be 26 mm. The number of filament guides in working position depends upon the size of the circumference of the mandrel portion 3b and upon the desired spacing of the filaments in the completed tube. In the described position of the guides the forward mandrel portion 3b is first advanced until the rear mandrel portion 3a enters the filament distributor 4. Let it be assumed that the diameter of the rear mandrel portion 3a is 70 mm. and that 44 filaments 12 are required to cover its surface. When mandrel portion 3b enters the filament distributor the 32 working filament guides will be withdrawn into a position about 36 mm. away from the mandrel axis, whereas 12 of the guides 10 that have been in position of rest advance into a corresponding position. The ends of the filaments 12 projecting from the freshly advanced filament guides can be applied to the mandrel for instance by hand or with a tweezer-like tool, and they will then be entrained by the longitudinal filaments 12 that have already been provided with plastics or the like. The longitudinal filaments 12 are in fact sprayed with an uncured plastics, resin or the like for forming the required plastics sections, immediately they have passed through the eyelets 11.

This will be hereinafter described in greater detail.

In an advantageous embodiment of the invention a row 13 of filament guides 10 is provided with setting means 9c for these guides. The filament guides in the row 13 for applying the additional filaments 12 that are now to be applied to the mandrel are pushed into working position with the aid of the setting means and all the subsequently required filament guides can be similarly activated by a single setting operation. The same also applies to the retraction of the filament guides 10 which are first advanced more closely to and reset at a greater distance away from the mandrel axis.

The proposed arrangement therefore permits the filament guides to be sectionally controlled in a simple manner. Immediately behind the filament distributor 4 supplementary filament guides 14 for the application of crossing filaments 15 are also provided (FIG. 1).

Figure 2:
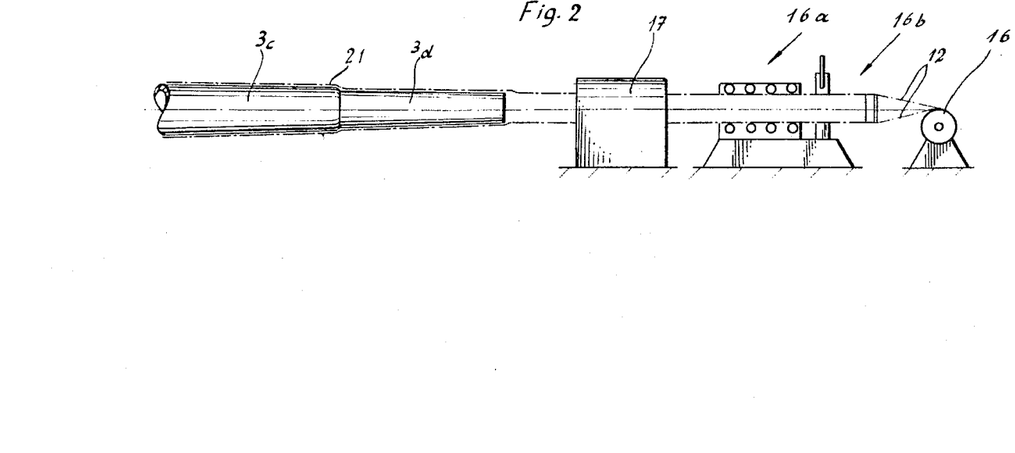
FIG. 2 is a side elevation of part of the apparatus shown in FIG. 1, additionally comprising a special shaping device, feed means and a reel.

FIG. 2 shows a divided mandrel 3c, 3d with a tapering external profile. In this drawing a shaping device 17 is schematically indicated between a reeling means 16 and the end of the mandrel. This shaping device will be later described in greater detail. The drawing also shows a feeder 16a and a cutting means 16b.

Figure 7:
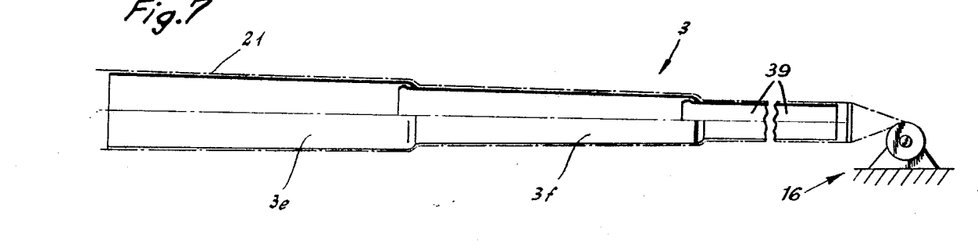
FIG. 7 is a longitudinal vertical section through a three-part mandrel on which a plastics tube is being formed.

Multipart mandrel 3 can be used in the apparatus according to the invention. FIG. 7 illustratively shows a mandrel consisting of three parts 3e, 3f and 3g, the smallest diameter portion of the mandrel being cylindrical and the two others having a conical taper.

The filament distributor 4 is easily exchangeably mounted on a holder 18. Several interchangeable filament distributors are provided for each machine for use according to the diameter range of the mandrel that is to be used, and to the number of filament guides the distributor is to possess. A filament distributor of average size may contain something like 200 filament guides 10.

Behind the filament distributor 4 the apparatus is fitted with sprayer nozzles 19 for spraying the material of which the plastics sections are to consist on to the filaments 12 and 15. Adjacent these sprayer nozzles air nozzles 20 are also provided which permit air to be blown on to the plastics tube whilst it is being formed behind the filament distributor. By regulating the temperature of the air stream emerging from the air nozzles 20 it is possible to control the viscosity of the sprayed plastics or like material.

Figure 7A:
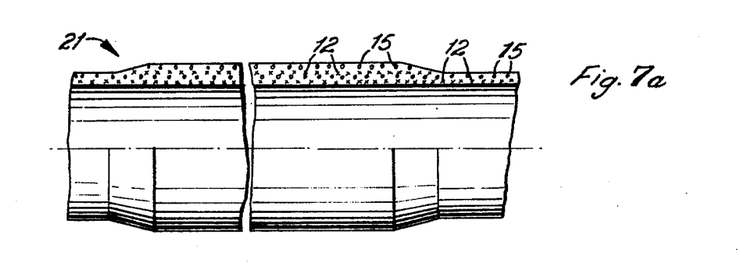
FIG. 7a is a part sectional fragmentary view of a mandrel carrying a plastics tube of longitudinally varying section.

The production of the plastics sections on mandrels 3 may proceed in the following manner:

Longitudinal filaments 12 are threaded through the eyelets 11 of the filament guides 10 and the ends of the filaments are connected to the reeling means 16. Preferably the minimum number of filaments 12 necessary for covering the mandrel are connected to the reel 16. However, further longitudinal filaments are also threaded ready for use into the eyelets 11 of the remaining filament guides. The longitudinal filaments that have been connected to the reeling device are run on to the mandrel and immediately in front of the filament distributor the spraying of plastics material through the nozzles on to the longitudinal filaments is begun whilst these longitudinal filaments 12 move forward on the advancing forward portion 3a of the mandrel. At the same time transverse filaments 15 are wound crosswise over this bottom layer of longitudinal filaments. The density of the transverse and longitudinal filaments is optional within very wide limits and will depend upon the mechanical strength the completed plastics section is desired to have. The transverse filaments 15 may be coated with plastics either directly through sprayer nozzles 19 or indirectly by applying sufficient plastics to the longitudinal filaments to embed the transverse filaments 15 when these are wound on to the mandrel. If desired, the viscosity of the, as yet uncured, plastics tube 21 can be controlled by blowing air on to the plastics tube 21 whilst it is still in course of being formed. During the advance of the mandrel 3, for instance when the rear end of the forward mandrel portion 3a reaches the filament distributor 4, more filaments can be run on to mandrel. The arrangements in the filament distributor required for this purpose have already been described. It is possible for instance to run several layers of longitudinal and transverse filaments on to the mandrel consecutively. The local density and the thickness of the several layers may be arranged to vary (cf. FIG. 7a).

When the plastics sections that are being produced on mandrel 3 have assumed the desired shape, the plastics tube 21 on the mandrel 3 is cured and then stripped off the mandrel. Whilst the first plastics tube is being made the reeling means 16 provides the forward pull for advancing the longitudinal filaments as well as, later, for the advance of the preformed tube. When the first tube-forming operation has been completed the reel 16 is replaced by a feeder of conventional type (only schematically shown in the drawings) and this feeder then continues to pull forward the unfinished tube and the longitudinal filaments connected thereto which then participate in the formation of the next portion of plastics tubing 21.

When a plastics tube has been cured and stripped from the mandrel 3, the latter is retracted into its starting position. The longitudinal filaments 12 which are not required for covering the forward portion 3b of the mandrel are broken so that only the longitudinal filaments 12 that are to be run on to forward portion 3b of the mandrel will be pulled forward by the preceding length of tubing or by the reeling device 16 to run on to the forward mandrel portion 3b as it advances again.

It will be readily understood that a mandrel with a continuous peripheral surface could likewise be used for the production of tubes or the like of constant cross section.

If the desired tubular plastics section can already be finish-produced on a mandrel 3 without further deformation being required, it is advisable to wrap a parting foil, for instance of cellophane, around the mandrel periphery before the first layer of longitudinal filaments is laid on to the same. This will facilitate the work on stripping the tube from the mandrel. Cone-shaped tubes, tapering hollow sections and so forth can thus be produced on the apparatus by performing the operational steps that have been described.

Figure 8A:
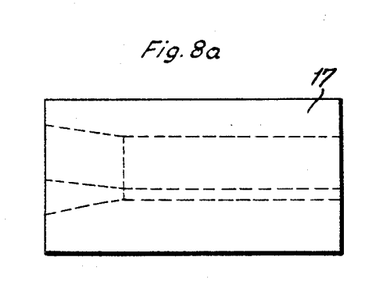
Figure 8B:
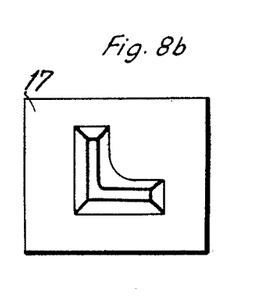
FIG. 8b is an end view, of an angle section.
Figure 9:
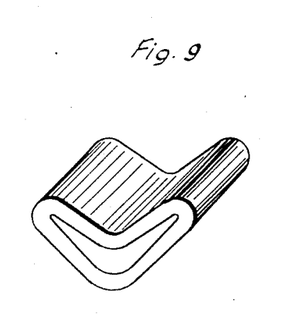
FIG. 9 is a portion of a plastics tube which has already to some extent been deformed into an angle section.
Figure 9A:
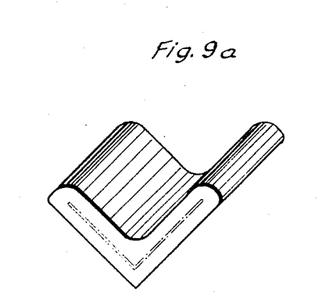
FIG. 9a is the finished angle section of fibre-reinforced plastics in which the former internal wall of the plastics tube is indicated by dot and dash lines revealing the manner of its production.
Figure 24:
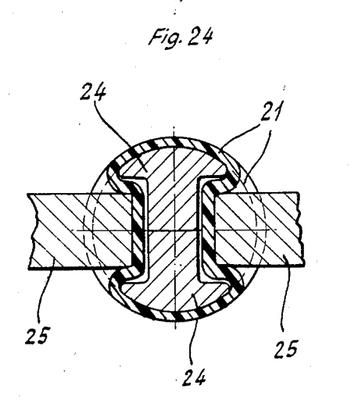
FIGS. 24 and 25 are details of the shaping device.
Figure 25:
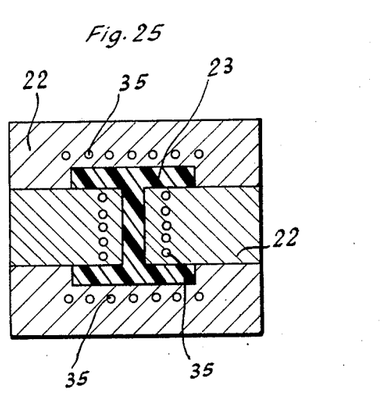

However, a further development of the invention also permits other sections, such as those illustratively shown in FIGS. 10 to 19, which may also be taper sections, to be produced. To achieve this end the apparatus proposed by the invention is associated with a shaping device generally indicated by the reference number 17. This shaping device operationally follows the mandrel. FIGS. 8a and 8b schematically illustrate such a shaping device 17 which is heatable. Heatable jaw members are shown in FIGS. 24 and 25. These jaw members define a channel corresponding to the contour of a plastics H-section 23 which it is desired to produce. FIG. 24 shows part of the shaping device in which the plastics tube 21 is subjected to preliminary deformation. The tube runs over two jaw-like members 24 whilst the portions of the plastics tube 21 between the two jaw members are forced inwards by two side jaws 25 which form a gradually constricting passage. The constricting effect may be due to the side jaws converging in the longitudinal direction, or alternatively, the two side jaws 25 may actually perform an inward movement. When leaving the pre-shaping device shown in FIG. 24 the plastics tube 21 will already have assumed a cross section which approximates that of the desired H. Final shaping may then be effected in a shaping device according to FIG. 25 which has a suitable entry opening. Again the final contour may be produced by a suitably convergently shaped passage formed between jaws 22, or the jaws may actually be arranged to close on the plastics section in the shaping device by moving in a direction at right angles to the direction of travel.

Figures 10, 12, 13, 14, 15, 16, 17, 18, 19, 26:
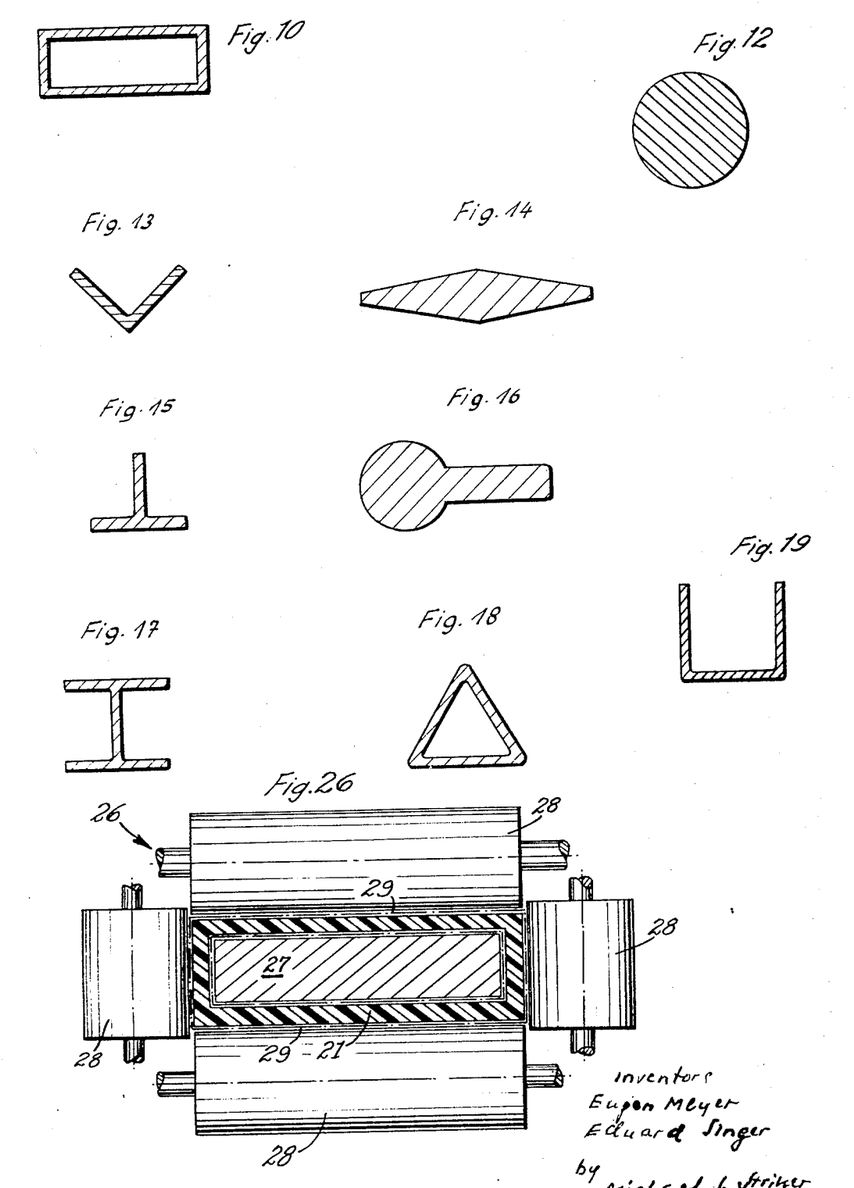
FIG. 10 is a box section.
FIGS. 12 to 19 are other sections.
FIG. 26 is a shaping device for producing a box section according to FIG. 10.

FIG. 26 is a schematic representation of a shaping device for the production of a box section of the kind shown in FIG. 10. Inside the shaping device, generally, indicated by the reference numeral 26, is a core 27 of rectangular cross section and the plastics tube 21 is arranged to run over the core in its interior. Parallel to the side faces of the core 27 and at a distance therefrom corresponding to the desired thickness of the hollow section wall are travelling endless belts 28 which may be of steel and heatable. When a shaping device of this particular kind is employed the finished plastics section can be formed with sharp edges. If a mandrel 3 of rectangular section is used for the same purpose and the plastics sections are produced without a following shaping process, the longitudinal edges of the finished section will be less sharply defined. It may nevertheless be an advantage to produce a plastics tube 21 which is subsequently to be shaped in a shaping device 26 on a mandrel of rectangular section. Dot and dash lines in FIG. 26 indicate the presence of parting foils 29 consisting of a material which prevents sticking, such as cellophane.

Figure 11:
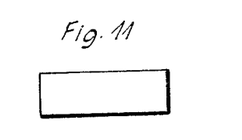
FIG. 11 is a flat section, which in
FIG. 11a is shown again on a larger scale.
Figure 11A:
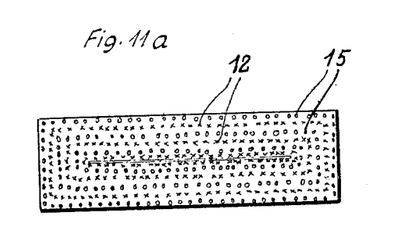

FIG. 11a illustrates a solid rectangular plastics section on a considerably enlarged scale in which small circles indicate the position of the transverse filaments and small crosses the position of the longitudinal filaments. The dotted line in the median plane of the section indicates the position of the original inside surface of the plastics tube. In the finished section opposite halves of the inside surface have been completely fused together. Naturally a flat section of the kind shown in FIG. 11a can be so produced that in the lengthwise direction the cross section tapers. To this end a conically tapering plastics tube would have to be squeezed together to form the solid section. FIG. 11a also clearly shows that the layers formed by the transverse filaments 15 and the longitudinal filaments 12 can be arranged to comply with the conditions needed for imparting the required strength to the finished section. When for example strong tensile strains will occur at the edge of the shape, thick layers with longitudinal filaments 12 can be inserted into this region of strong tensile strain. The same can be applied for example in regions where by the inside overpressure within a hollow plastics section strong tensile strains in tangential direction will arise. There the layers formed by the transverse filaments 15 will be reinforced.

Figure 22:
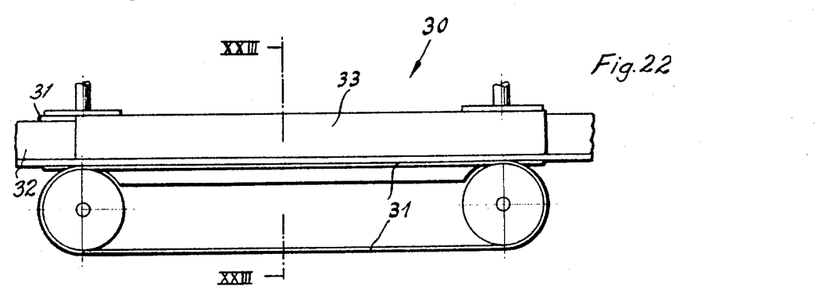
FIG. 22 is a side view of a shaping device equipped with belt feeders.
Figure 23:
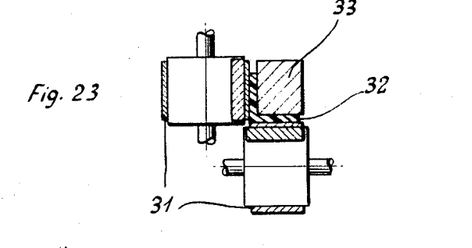
FIG. 23 is a section of a shaping device according to FIG. 22, taken on the line XXIII—XXIII.

FIGS. 22 and 23 illustrate a shaping device, generally indicated by the reference numeral 30, which comprises two endless revolving belts 31 running in relatively normal planes for the purpose of pressing a plastics section 32 against a stationary backing plate 33. A shaping device may consist of substantially stationary jaws, as illustrated in FIG. 17, or of an arrangement of the kind illustrated in FIGS. 22 and 23 with revolving belts, or of one of the afore-mentioned arrangements combining the features of both types of device.

Figure 20:
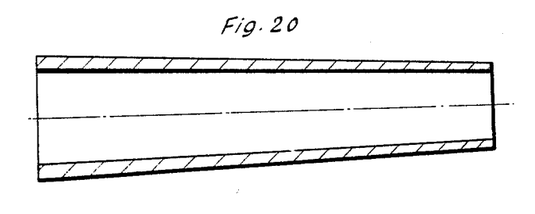
FIG. 20 is an axial section of a tapering tube.
Figure 21:
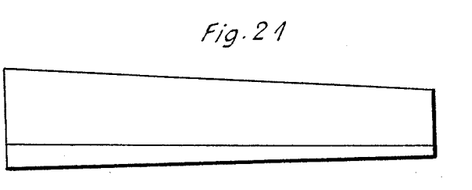
FIGS. 21 and 21a are an angle section with a longitudinal taper.
Figure 21A:
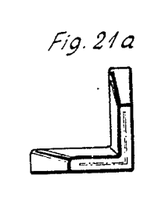

FIGS. 21 and 21a are an end-on view and a side view respectively of a plastics angle section which tapers in the longitudinal direction. Such a section can be produced from a plastics tube of conically tapering section as shown in FIG. 20.

It may be mentioned that the hot air issuing from the air nozzles 20 may serve both to heat the as yet uncured plastics and to remove volatile constituents such as plasticisers contained in the plastics. It may often be useful to impart a slight taper to mandrels which are not as such intended for producing taper sections, in order to facilitate the subsequent stripping of the plastics tube 21 from the mandrel.

It will be understood from FIG. 1 that the filament guides 14 for laying on the transverse filaments 15 are rotatably mounted and adapted to be rotated around the mandrel 3 for running filaments 15 around the periphery of the mandrel. Conveniently the filament guides 14 as well as the spraying and air nozzles 19 and 20 may all be mounted in a rotary head 36 coaxially surrounding the mandrel. This rotary head may then be associated with a disc 37 which carries the bobbins 38 from which the transverse filaments 15 are withdrawn through the guides 14. The mandrel 3 itself does not rotate, but performs exclusively axial movements in which the longitudinal filaments 12 participate.

The beginning of the operation may here once again be described in somewhat greater detail.

The longitudinal filaments 12 which are to be laid up on the forward mandrel portion 3b are first connected to the reeling device 16 for instance by means of a rope, the reeling device being located at a major distance—say 20 metres—away from the filament distributor 4. At a rate corresponding to the speed of advance of the mandrel 3 the reel advances the longitudinal filaments which have been connected thereto and the previously described process of forming the plastics tube 21 then begins. If it is desired to shape the plastics tube 21 after this has been drawn off the mandrel a shaping device 17 is provided between the end of the mandrel in its fully extended position and the reeling means 16, the longitudinal filaments 12 being first passed through this shaping device. The latter is either directly associated with drying equipment or it may itself contain the necessary equipment for drying the plastics tube or section to cause polymerisation of the plastics material.

Between the reeling device 16 and the mandrel or between the reeling device and the shaping device 17 there is further provided a feed means 16a and a cutting means 16b, both shown schematically in the drawing. Assuming that the first tubular plastics section formed on the mandrel leaves the shaping device 17 in the form of a fully cured workpiece, it enters the feeder 16a which from now onwards feeds the section forward for the performance of the further manufacturing processes. The longitudinal filaments 12 which have been laid up on the forward mandrel portion 3b at the beginning of the manufacturing process remain continuously connected to the plastics section that has already reached the feeder. Behind the feeder 16a is a cutting means which is intended to cut plastics sections of a given length off the section as it emerges from the feeder 16a. Once the manufacturing process has been started the feeder 16a therefore undertakes the functions of the reeling device 16 which has above been described. The connections of the leading ends of the longitudinal filaments 12 to the reeling device 16 are broken and the reel itself is eliminated from the further process.

The disc 39 which carries the bobbins 40 for the longitudinal filaments 12 is rotatably mounted on a support 41 but it is also arrestable. This makes the disc 39 easily accessible and facilitates the replacement of empty bobbins 40. Alternatively the bobbins may be mounted on vertical stationary spindles in the vicinity of the filament distributor 4.

If it is desired to produce cylindrical tubes with a smooth internal surface it is advisable to cover the mandrel with a parting foil, consisting for instance of cellophane, before the longitudinal or transverse filaments 12 and 15 and the plastics are applied to the mandrel. To this end a cellophane tape may be withdrawn from a roll, the width of the tape being at least equal to the circumference of the mandrel. Before the actual manufacturing process begins this tape is applied to the leading end of the mandrel so that it completely envelops the same. Conveniently the tape may be a little wider than the circumference of the mandrel, say 2 cms. wider, to permit the edges of the tape to be lapped. The tape then advances together with the mandrel and the longitudinal filaments. Its presence facilitates the withdrawal of a plastics section from a cylindrical mandrel and causes the inside wall of the tubular section to be smooth. The application of the parting cellophane tape to the peripheral surface of the mandrel is effected by devices known to the art.

Possibly the parting tape may already be provided with a plastics coating in such manner that at least some of the longitudinal and transverse filaments 12 and 15 that are laid up on the mandrel will already be impregnated by this plastics coating.

When a finished portion of the plastics section has left the production process in the form of a tube the parting tape can be removed from the inside of the tube for instance by soaking it off with water.

Normally, the transverse filaments will not be specially impregnated or sprayed with plastics. They may be impregnated as they run on to the plastics-covered longitudinal filaments.

The longitudinal filaments may be provided with liquid plastics for instance through the above-mentioned sprayer nozzles 19 and 19a. An alternative method of impregnating the longitudinal filaments 12 consists in providing a supply means (not shown in the drawings) which applies liquid plastics to the parting foil enveloping the mandrel 3. This supply means may be arranged for instance directly in front of the point where the longitudinal filaments 12 are laid on and, urged by spring means, the supply means bear lightly against the enveloping foil. The longitudinal filaments will then embed themselves in this plastics layer as they run on to the mandrel. If desired, several such coatings may be applied in such manner that a layer of plastics is applied to a first layer of longitudinal filaments and that a further layer of longitudinal filaments—possibly after the application of an intervening layer of transverse filaments—is then run into the plastics. It will be readily understood that the plastics tube may be additionally sprayed with plastics from nozzles 19.

If desired the mandrel 3 or the shaping device 17 could also be internally heated by a stream of warm air. In the case of a plastics section with a continuous cavity the warm air can then simply emerge from the front end.

For forming solid sections without a cavity an outlet channel which may possibly slightly project into the finished tube should be provided inside the mandrel 3. Moreover, provision may at the same time be made for external heating either by warm air or thermal radiation.

It may also be mentioned that a layer which serves as a parting foil could be sprayed on to the mandrel.

A very important further development of the method proposed by the present invention consists in adapting a leading mandrel portion 3 to be rearwardly withdrawn from the part of the plastics tube that has already sufficiently set, whilst the remainder of the tube is still in course of production, in other words, whilst longitudinal and transverse filaments and plastics are still being applied to the rear portion 3b of the mandrel. The entire length of the tube in course of production need not therefore be supported by the mandrel 3, provided the leading portion of the plastics tube has already become sufficiently hard to support itself. In this manner several telescopically interposed mandrel portions may be consecutively advanced, to receive filaments and plastics and then rearwardly withdrawn from the sufficiently hardened tube portion whilst the production process on the mandrel section which is still in the region of the filament guides 10, 14 and the nozzles 19 still goes on. Finally the rearward mandrel portion may likewise be retractable whilst the leading mandrel portion still projects sufficiently far forward from the retracted portions for the process to be continued on this projecting part.

The continuation of the process is then performed by running the appropriate number of longitudinal filaments 12 on to the leading portion of the mandrel.

Suitable plastics for performing the method proposed by the invention are for instance polyester or epoxy resins. However, the binding medium for the filaments may also be other binders with or without fillers.

The filaments will usually be untwisted ropes of glass fiber. However, metal wires could also be used as reinforcing material.

In FIG. 25 the heating conductors for heating the jaws are marked 35.

The hollow plastics sections produced by the method proposed by the invention may be used as supports or masts of roughly uniform strength. Its application is particularly advantageous in cases where besides the specific properties of the plastics high strength and/or special sectional shapes are desired.

We claim:
1. Apparatus for producing elongated filament reinforced plastic members comprising, in combination, a mandrel having at least two axially aligned elongated portions of different diameter; support means supporting said mandrel for movement in longitudinal direction; means connected to said mandrel for moving the same in said direction between a starting and an advanced position; a filament distributor surrounding said mandrel and carrying a plurality of filament guides for guiding filaments in close vicinity of the peripheral surface of said mandrel, said filament guides being movable from a retracted inoperative position to advanced different working positions in which they are closer to said peripheral surface than in said retracted position; pulling means spaced in substantially axial direction from the small diameter end of the mandrel for pulling filaments passed through said filament guides in longitudinal direction; winding means surrounding the mandrel between said filament distributor and said pulling means for winding at least one filament in transverse direction about the longitudinally applied filaments; and means for applying plastic material to said filaments at least during their application to said mandrel to thus form a plastic tube reinforced by said filaments on said mandrel.

2. An apparatus as defined in claim 1, wherein said filament distributor includes an annular member surrounding said mandrel and wherein said filament guides are arranged in a plurality of axially spaced rows adjustable in substantially radial direction.

3. An apparatus as defined in claim 2 and including means associated with each row of filament guides for simultaneously adjusting the position of the guides in the respective row.

4. An apparatus as defined in claim 1 wherein the portion of smaller diameter of said mandrel is telescopically guided in the portion of larger diameter and movable independently of said larger diameter portion.

5. An apparatus as defined in claim 4, wherein said means for moving said mandrel in axial direction includes two elements respectively connected to said mandrel portions for moving the same independent from each other.

6. An apparatus as defined in claim 1, wherein a chamfered transition is provided at the junction between the mandrel portion of larger diameter and that of smaller diameter.

7. An apparatus as defined in claim 1, wherein said mandrel portions have outer surfaces tapering in axial direction.

8. An apparatus as defined in claim 1 and including heating means in the interior of said mandrel.

9. An apparatus as defined in claim 1, wherein said filament distributor is removably mounted on said support means so that it can be easily exchanged against another filament distributor.

10. An apparatus as defined in claim 1, wherein said means for applying plastic material to said filaments comprises at least one spray nozzle for spraying the plastic material against the filaments as they are applied to said mandrel.

11. An apparatus as defined in claim 1, and including blower means for blowing hot air onto said filaments after plastic material has been applied thereto.

12. An apparatus as defined in claim 1, wherein said winding means comprises a rotatable annular member coaxial with said mandrel and including at least one filament guide extending from said annular member toward said mandrel.

13. An apparatus as defined in claim 12, wherein said means for applying plastic material to said filaments comprises at least one spray nozzle mounted in said annular member for rotation therewith, and including an air blow nozzle mounted in said annular member downstream of said spray nozzle.

14. An apparatus as defined in claim 1, and including means between said mandrel and said pulling means for deforming the tube in transverse direction.

15. An apparatus as defined in claim 14, wherein said deforming means comprises a plurality of endless belts forming inner runs engaging said tube.

16. An apparatus as defined in claim 15, wherein said belts are heated.

17. An apparatus as defined in claim 15, wherein the position of the belts relative to each other may be changed.

18. An apparatus as defined in claim 14, wherein said deforming means comprise a stationary polygonal core and a pair of endless belts arranged for pressing longitudinally extending tube portions against said core.

19. An apparatus as defined in claim 14, wherein said deforming means comprise jaws defining between themselves a cavity with a contour corresponding to the contour to which the tube is to be deformed.

20. An apparatus as defined in claim 19 and including a holder in which said jaws are mounted movable toward and away from each other.

21. An apparatus as defined in claim 19, and including means for heating said jaws.

22. An apparatus as defined in claim 19, wherein the cavity defined by said jaws tapers in axial direction toward said pulling means.

23. An apparatus as defined in claim 1, and including cutting means between said mandrel and said pulling means.

References Cited

UNITED STATES PATENTS

| | | | |
|---|---|---|---|
| 2,714,414 | 8/1955 | Ganahl et al. | 156—171 |
| 2,760,549 | 8/1956 | Nash et al. | 156—432 XR |
| 2,858,992 | 11/1958 | Wentz | 156—443 XR |
| 2,938,566 | 5/1960 | Toulmin | 156—431 |
| 3,032,461 | 5/1962 | Baker et al. | 156—175 |
| 3,033,729 | 5/1962 | Shobert | 156—149 |
| 3,148,102 | 9/1964 | Eakins et al. | 156—161 |
| 3,250,654 | 5/1966 | Rubenstein | 156—171 |
| 3,306,797 | 2/1967 | Boggs | 156—171 |
| 3,351,509 | 11/1967 | Richardson et al. | 156—195 |
| 2,918,104 | 12/1959 | Scott et al. | 156—180 |
| 3,031,361 | 4/1962 | Strickland | 156—180 XR |
| 3,127,910 | 4/1964 | Scott | 156—180 XR |

EARL M. BERGERT, Primary Examiner

D. J. FRITSCH, Assistant Examiner

U.S. Cl. X.R.

156—443, 497